E. A. TOWNSEND.
DIRIGIBLE HEADLIGHT.
APPLICATION FILED MAY 20, 1919.

1,332,082.

Patented Feb. 24, 1920.
3 SHEETS—SHEET 1.

WITNESSES

INVENTOR
E. A. TOWNSEND
BY
ATTORNEYS

E. A. TOWNSEND.
DIRIGIBLE HEADLIGHT.
APPLICATION FILED MAY 20, 1919.
1,332,082.
Patented Feb. 24, 1920.
3 SHEETS—SHEET 2.
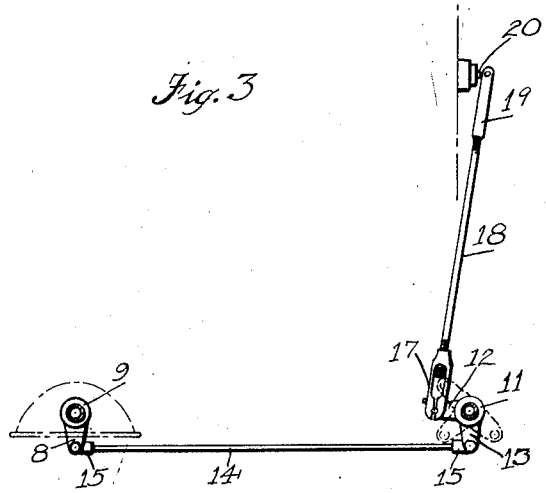
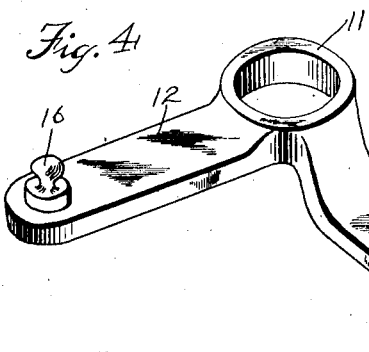
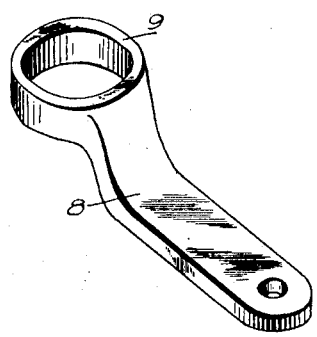
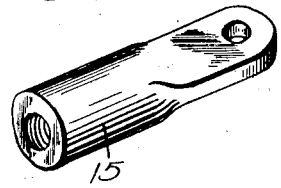
WITNESSES
INVENTOR
E. A. TOWNSEND
BY
ATTORNEYS E. A. TOWNSEND.
DIRIGIBLE HEADLIGHT.
APPLICATION FILED MAY 20, 1919.
1,332,082.
Patented Feb. 24, 1920.
3 SHEETS—SHEET 3.
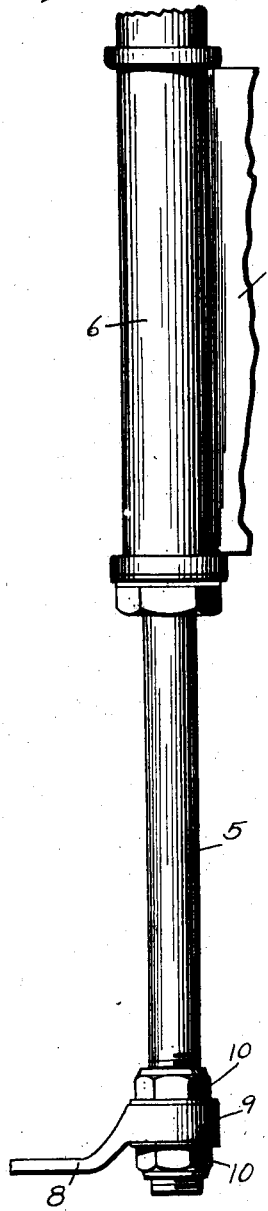
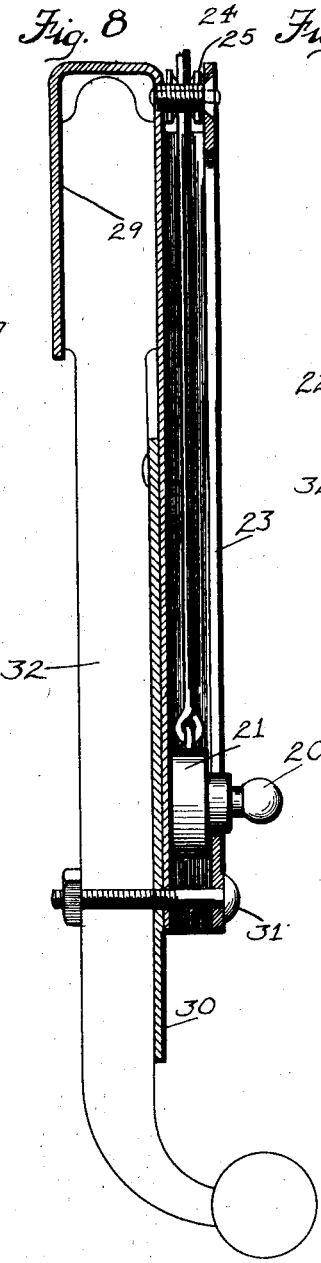
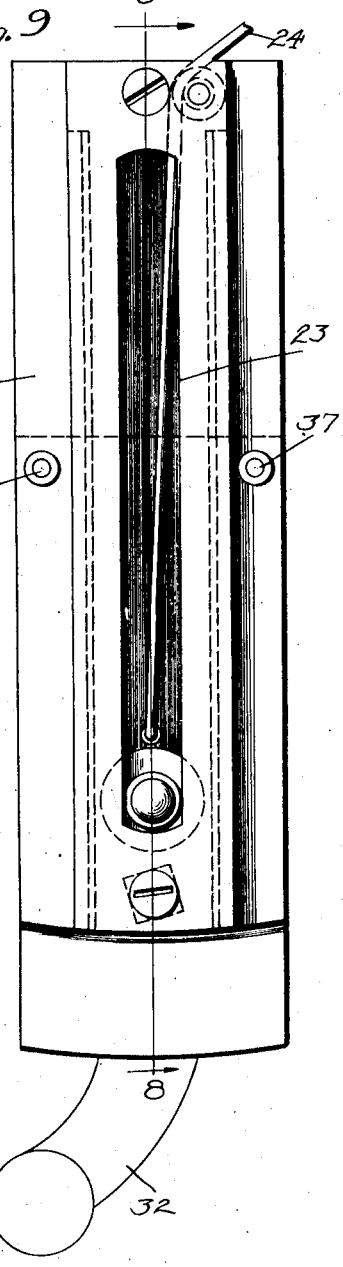
Inventor
E. A. TOWNSEND

UNITED STATES PATENT OFFICE.

ERNEST ADRIAN TOWNSEND, OF TUSCALOOSA, ALABAMA.

DIRIGIBLE HEADLIGHT.

1,332,082.  Specification of Letters Patent.  Patented Feb. 24, 1920.

Application filed May 20, 1919. Serial No. 298,434.

*To all whom it may concern:*

Be it known that I, ERNEST A. TOWNSEND, a citizen of the United States, and a resident of Tuscaloosa, in the county of Tuscaloosa and State of Alabama, have invented certain new and useful Improvements in Dirigible Headlights, of which the following is a specification.

My invention is an improvement in dirigible headlights, and has for its object to provide mechanism of the character specified, especially adapted for use with motor vehicles for constraining the headlights to turn with the wheels, in order that the said lights may illuminate the road directly in front of the car, and wherein means is provided capable of being operated from the driver's seat for varying the connection between the wheels and the headlight so that the headlights will turn to a greater or less degree, in accordance with conditions.

In the drawings:

Fig. 3 is a top plan view of the controlling mechanism detached;

Fig. 4 is a perspective view of the elbow lever;

Fig. 5 is a similar view of the lamp post arm;

Fig. 6 is a perspective view of the connection between the arms of Figs. 4 and 5 and the link;

Fig. 7 is a side view of the lamp post supporting sleeve;

Fig. 8 is a section on the line 8—8 of Fig. 9;

Fig. 9 is a front view of the variable connection between the lamp controlling arm and the radius rod.

Figure 1:
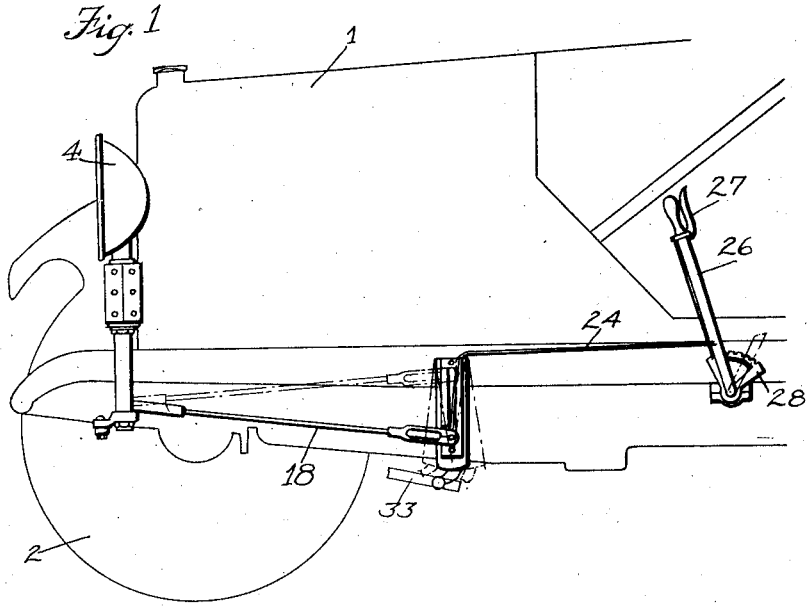
Figure 1 is a partial side view of a motor vehicle provided with the improved mechanism.
Figure 2:
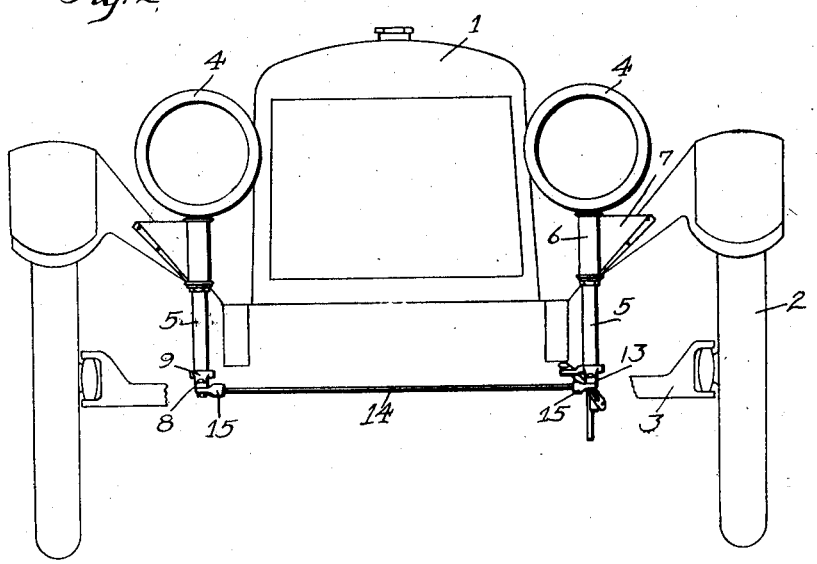
Fig. 2 is a front view.

The present embodiment of the invention is shown in connection with a motor vehicle, consisting of the usual body 1 having wheels for supporting the same, the front wheels 2 being shown in the present instance, and the said wheels are mounted on spindles, which are hinged to the ends of the front axle 3 to swing simultaneously in the same direction to guide the vehicle.

The lamps 4, which are of any usual or desired construction, are mounted at the tops of posts 5, each of which is journaled in a sleeve 6 in a bracket plate 7 connected to the adjacent mud guard support. A radial arm 8 is provided for that post at the side remote from the driver, namely, the post at the left, and this arm 8 has a bearing 9 which encircles the post and is held thereon by lock nuts 10 arranged above and below the bearing. The other post is engaged by the bearing 11 of an elbow lever having arms 12 and 13 extending at approximately right angles with respect to each other, and the bearing is held on the post in the same manner as the bearing 9 is held on the other post.

The arm 8 of the one post is connected with the arm 13 of the other post by a link 14. This link has at each end a socket 15 into which the end of the link is threaded, and each socket has a perforated ear for pivotal connection with the adjacent arm 8 or 13, as the case may be. This connecting link 14 constrains the two lights to swing together in the same direction.

The arm 12 of the elbow lever has a head 16 which is engaged between the jaws of a split clamp 17. The jaws are recessed to receive the head, a species of ball and socket connection being thus provided. The opposite end of the clamp 17 has threaded therein one end of a link 18 and the other end of the link is threaded into a similar clamp 19, which engages a head 20 on a slide 21 mounted to move vertically in a guideway 22. This guideway 22 is a species of casing having a slot 23 in its front wall through which the head extends, and the slide is moved vertically by means of a flexible member 24, as, for instance, a cord or wire, which is connected at its lower end to an eye on the slide. The cord passes over a pulley 25 at the top of the guideway to a suitable lever 26 pivoted adjacent to the driver's seat and having latch mechanism 27 for engaging a toothed quadrant 28 to hold the lever in adjusted position.

It will be obvious that when the lever is released from the latch mechanism the slide may be moved vertically toward or from the pivotal connection, to be described, of the slide 22. This guideway is provided at its rear face with a rearwardly offset depending lug 29 which is adapted for engaging behind the steering pitman 32, and at its lower end the guideway is secured to the pitman by means of a bolt and nut 31. A plate 30 is secured to the rear face of the guideway by means of the bolt and nut 31, and this plate is arranged between the lower reduced portion of the pitman and the guideway to properly space the guideway. Thus when the wheels are swung the guideway will swing with the pitman, as indicated in dotted lines in Fig. 1, and the link 14 will participate in this movement, the extent of participation depending upon the position of the slide in the guideway. When the slide is at the top of the guideway the swinging of the guideway will not affect the link 14 and will not affect the lamp. When, however, the slide is at the bottom of the guideway the lamps will swing to their widest extent, swinging practically to the same angle as the wheels.

All degrees of swinging between zero and the maximum may be attained by moving the slide to the proper point in the guideway. When it is not desired that the lamp shall follow the swinging of the wheels the slide is moved to the top of the guideway.

I claim:

The combination with movable vehicle headlights coupled together for simultaneous movement, and the steering apparatus of the vehicle; of a bracket comprising a plate having its upper end bent backwardly upon itself and engaged upon the steering pitman, a slotted channel shaped guide member secured to the plate, a clamp carried by the lower portion of the plate and encircling the pitman, a block slidable within the guide member and having an extension passing through the slot therein, a link connecting said extension with one of the headlights whereby upon pivotal movement of said bracket both headlights will be correspondingly moved, lever control means for shifting said block toward or away from the pivot point of the bracket, and means for holding said means at adjusted positions.

ERNEST ADRIAN TOWNSEND.